United States Patent [19]

Folker

[11] 3,999,325
[45] Dec. 28, 1976

[54] SNAG-HOOK FOR SALMON FISHING

[76] Inventor: John F. Folker, 6135 N. Lowell Ave., Chicago, Ill. 60646

[22] Filed: Aug. 6, 1975

[21] Appl. No.: 602,233

[52] U.S. Cl. .............................. 43/42.7; 43/43.14; 43/44.81; 43/44.82
[51] Int. Cl.² ...................................... A01K 83/00
[58] Field of Search ............ 43/44.81, 44.82, 42.7, 43/42.38, 43.14, 42.09, 44.8, 17.2, 44.96, 44.97, 43.1

[56] References Cited
UNITED STATES PATENTS

| | | | |
|---|---|---|---|
| 2,770,909 | 11/1956 | Illgner | 43/43.14 |
| 3,181,265 | 5/1965 | Cook | 43/44.81 |
| 3,604,141 | 9/1971 | Spencer | 43/44.81 |

*Primary Examiner*—Warner H. Camp
*Attorney, Agent, or Firm*—Hill, Gross, Simpson, Van Santen, Steadman, Chiara & Simpson

[57] ABSTRACT

A snag-hook particularly adapted for salmon fishing having barbed tines having a central stem terminating into an eye for the attachment of a fish line thereto, the hook may be a three-tined barbed hook having a two-piece weighting device extending from the hook in a direction away from the tines and eye of the hook. The two-piece device constitutes a crown and weight detachably joined by a screw-threaded coupling and clamped to the bight portions of the tines of the hook. The weight may be a generally cylindrical member having a knurled peripheral surface which may be readily grasped by the fingers of the user, and having a threaded boss extending from one end thereof. The crown may be a generally cylindrical member having a bore extending therethrough to receive the eye of a particular size hook. One end of the crown is slotted in accordance with the number of tines of the hook to receive the tines. The slots intersect the bore of the crown which is threaded for coupling engagement with the boss extending from the weight. The crown may have a tapered shank to establish a prescribed spacing arrangement between the barbed tips of the hook and the shank of the crown to close the gap between the barbed tips to conform to state regulations.

5 Claims, 8 Drawing Figures

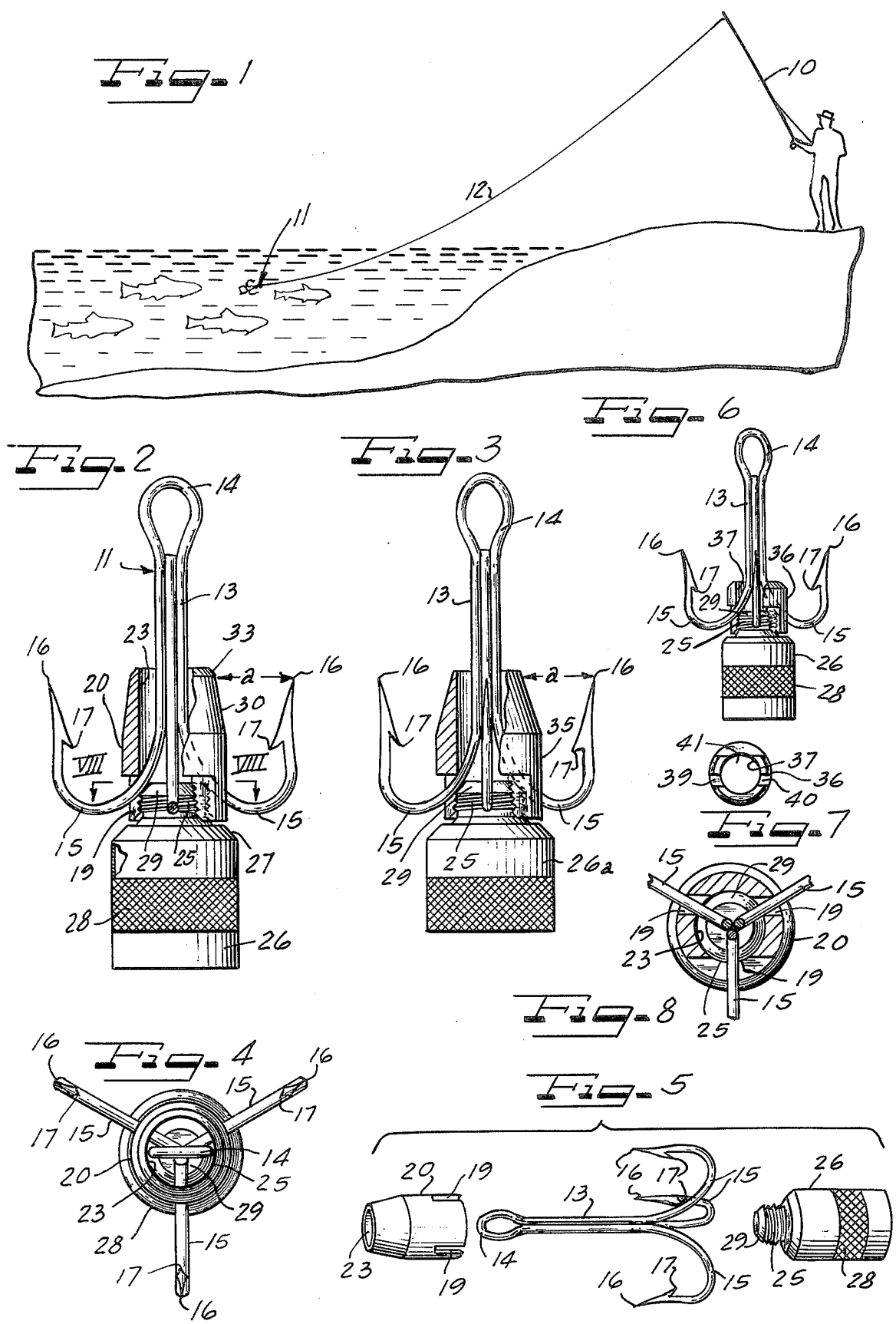

SNAG-HOOK FOR SALMON FISHING

FIELD OF THE INVENTION AND PRIOR ART

Snag-hooks for snagging salmon and other fish when swimming to spawning grounds have previously been used and have been provided with a weight which in many instances is molded directly onto the snag-hook or else is in the form of a piece of lead or heavy metal tied directly onto the hook with wire or other suitable fastening means.

BACKGROUND OF THE INVENTION

Fishing for salmon and other spawning fish by snagging the salmon with a weighted hook as they swim to their spawning grounds has become quite common, particularly in the Great Lakes region where salmon are seasonally planted in the lakes for ecological purposes. The salmon die after spawning and usually swim to spawning grounds in great numbers, so may readily be snagged with a barbed hook. The hook, however, must conform to state regulations. As for example, in Wisconsin, the exposure from the tip of the hook to the stem cannot be more than ½ inch. In Illinois, the spacing from the tip of the hook to the stem or shank of the weight or clamping means for the weight must be ½ inch or more. It has thus become desirable to have interchangeable hooks and weights providing the required spacing between the tip of the hook and stem or shank of the weight, which will conform to the laws of the state in which the fishing is carried out.

It should, of course, be understood that in snag-fishing, the hook is cast into the water to snag a fish swimming to its spawning grounds. The hook, therefore, has more than one barbed tine to assure the snagging of the fish when hit by the weight and hook or when the hook is drawn along the fish into contact therewith.

The present invention improves upon the prior art snag-hooks in that the hook may be interchangeably mounted on weights of different lengths and weights and coupled to the weight by a crown having a shank portion giving a preselected spacing between the tip of the hook and the shank portion of the crown.

Other advantages of the invention are that a snag-hook may be weighted in a simple manner and the weights may be clamped to the tines of the hook by a central crown coupled to the weight and having a shank portion providing a predetermined spacing between the barbs of the hook and the shank.

A further advantage of the invention is that a simple form of crown and coupling may couple the hook to the weight, and the bight portions of the tine of the hook leading to the stem of the hook may be recessed in a crown detachably coupled to a metal weight extending away from the tines and eye of the hook.

A still further advantage of the invention is that a three-tined hook may be received in a crown detachably coupled to a weight in which the crowns may be varied in accordance with different fishing laws to provide the required spacing between the tips of the barbs of the hook and a shank portion of the crown.

A still further advantage of the invention is that the hook may be recessed in a crown and coupling member and detachably held thereto by the crown and coupling member, which may be formed to provide the required spacing between the tips of the barbs of the hook and the weight.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a schematic view illustrating the principle of snagging fish swimming to their spawning grounds by a snag-hook constructed in accordance with the principles of the present invention;

FIG. 2 is a view in side elevation of a snag-hook weight and crown coupling the hook to the weight with certain parts of the crown shown in section;

FIG. 3 is a view somewhat similar to FIG. 2, but showing a shorter and lighter weight than that shown in FIG. 2;

FIG. 4 is a top plan view of the hook, crown and weight shown in FIGS. 2 and 3;

FIG. 5 is an exploded view illustrating the hook, crown and weight in position to be assembled to provide a weighted hook with predetermined spacing between the barbed ends of the tines and shank of the crown;

FIG. 6 is a view somewhat similar to FIGS. 2 and 3, but showing a different form of crown giving a greater spacing between the barbed ends of the tines of the hook and the crown and stem of the hook;

FIG. 7 is a bottom plan view of the crown shown in FIG. 6 illustrating the slots in the crown receiving the tines of the hook; and FIG. 8 is a transverse sectional view taken substantially along line VIII—VIII of FIG. 2.

DESCRIPTION OF PREFERRED EMBODIMENTS OF INVENTION

In the embodiment of the invention illustrated in the drawings, a fisherman is shown as standing along the bank of a body of water holding a casting rod 10 and in the act of completion of the casting of a weighted snag-hook 11 on the end of a line 12 in an effort to snag a fish, such as salmon, and land the fish. The snag-hook 11 is shown in FIGS. 2, 3, 4, 5, 6 and 8 as being a three-timed hook for the purpose of illustrating the invention, although the hook need not necessarily be a three-tined hook, but may have any number of tines, such as from one to six tines, as considered desirable by an individual fisherman to snag and land a desired fish.

In FIGS. 2, 4, 5 and 8, the tines 15 extend from a central stem 13 having an eye 14 on the end thereof adapted to be attached to the fishing line 12 in a conventional manner. Two tines may be formed integrally with the eye and stem while the third tine may be welded to the shank to provide three barbed tines 15 having pointed ends 16 and barbs 17 facing in a direction opposite to the pointed ends thereof to snag a fish when drawn along the side, bottom or back of the fish. The tines 15 have bight portions extending from the stem 13 outwardly along axial slots 19 of a crown 20, spaced in accordance with the spacing of the tines, which spacing is shown as being 120° apart, but which may vary in accordance with the number of tines of the hook. The slots are formed by milling the crown 20 by a double milling cutter, the mills of which are offset from the center of the crown and intersect a central apertured portion or bore 23 leading through the crown from one end thereof to the other. The apertured portion 23 is internally threaded adjacent its inner or lower end and is adapted to be threaded on a boss 25 of a weight 26. Said weight 26 is shown as being cylindrical in form and as having a beveled end portion 27 on the end of said weight adjacent the boss 25. The weight 26 is knurled, as indicated by reference numeral 28, to enable ready threading of the boss 25 into the threaded portion of the crown 20. The end of the boss 25 is also beveled as indicated by reference numeral 29 to center and clamp a snag-hook to the crown by engaging the beveled end of the boss 25 with the bight portions of the tines 15 extending through the slots 19 of the crown 20.

The crown 20 also has a tapered shank portion 30 extending along the stem 13 of the hook and extending along and spaced inwardly of the barbs 17 to place the tapered shank of the crown in the correct spaced relationship with respect to the tips of the hook in accordance with state snag-fishing regulations.

The taper of the shank of the crown and length of the taper may be varied, and different tapered crowns may be used in different localities to provide a prescribed spacing "a" between the barbed end of the hook and the tapered shank 30.

In FIG. 3, I have shown a relatively short weight 26a lighter than the weight 26 shown in FIG. 2, where required or preferred by an individual fisherman. Also, in FIG. 3, the tapered shank of the crown extends inwardly of and along the barbs of the hook and provides a spacing a between the tips of the barbs and the tapered shank. In FIG. 2, the tapered shank is beveled at its end, as indicated by reference numeral 33, to provide a wider throat between the shank and barbed tines of the hook than in FIG. 3 and to avoid impeding the progress of the barbed hook along and into the body of a fish.

In FIG. 6, I have shown a modified form of crown in which the tapered shank of the crown is eliminated and the crown has a beveled advance end with a generally cylindrical body extending therefrom. This form of crown gives a predetermined spacing between the wall of the crown and the barbs of the hook and between the tips 16 of the barbs of the hook and the central stem 13. Such a crown may be used interchangeably with the crowns 20 and 35 to provide the required spacing between the tips of the barbs of the hook and the shank of the crown or the tips of the barbs of the hook and the stem 13.

FIG. 7 shows a bottom plan view of the crown 36 having a central drilled or apertured portion 37 and three slots 39, 40 and 41 for the bight portions of the tines of the hook and formed by a single transverse milling operation by two parallel milling cutters and cutting across the crown, offset from the center thereof as in a companion application filed herewith by Robert P. Wolf, in which the slots are in the weight and the crown is not used. This same construction is used for the crowns 20, 35 and 36.

FIG. 8 illustrates the bight portions of the tines of the hook received in the slots 19 shown in FIG. 2.

The bored or apertured portions of the crowns are sized to receive the eye of a particular size hook to assure the required spacing between the tips of the hook and shank of the crown, and to avoid the use of hooks which would not conform to state fishing requirements.

The interchangeable weights shown in FIGS. 2, 3, 5 and 6 can, for example, weight three-quarters of an ounce, 1 ounce or 1¼ ounce, although they need not necessarily be of such weights and may vary in accordance with the preferences of an individual fisherman. The weights may also be color-coded to enable the fisherman to readily determine the weight of a selected weight. The ends of the bosses 25 may be beveled as previously mentioned and as indicated by reference numeral 29 to form a centering core and engage the bight portions of the tines of the hook and cooperate with the slots in the crown to clamp the hook in place when the weight and crown are locked in assembly with the hook.

It may be seen from the foregoing that a simplified weighting means has been provided for a snag-hook avoiding the use of lead weights and the contamination which may be caused by accidental loss of the weights and provides an interchangeable weighting system for snag-hooks, enabling the weight to be preselected by the fisherman in accordance with snag-fishing conditions and the preferences of the fisherman. The crown and weight clamping assembly for the hook also provides a positive clamping means for clamping the weight to the snag-hook and a spacing means between the tip of the hook and the shank of the crown or stem of the hook, to enable the fisherman to readily comply with state fishing requirements.

I claim as my invention:

1. For use with the snag-hook having an eye, a stem extending longitudinally from said eye and terminating in a plurality of reversely turned tines having hook portions spaced radially outwardly from said shank, the improvement of a two-piece sinking weight comprising,
 a first piece and a second piece having intermating locking parts engageable with one another to lock the sinking weight in assembly with the snag-hook,
 one of said pieces constituting one of a plurality of modularized, selectively replaceable, generally cylindrical weighted body members each sized in graduated weights of different graded denominations,
 one of said pieces being of lesser diameter than the hook portions and adapted to have said eye and said stem inserted therethrough,
 one said piece having formed therein a plurality of circumferentially spaced slots corresponding in number to the tines of the snag-hook for receiving the tines in seated relationship,
 whereby the sinking weight can be selectively varied in size by the user for fishing adjustment on the snag-hook,
 one of said pieces comprising a generally cylindrical part having an axial opening extending therethrough and forming a centrally disposed through-bore for receiving said eye and said stem of the snag-hook, said part further comprising a plurality of circumferentially spaced slots in one end thereof for seating a corresponding plurality of tines on the snag-hook, and interfitting parts formed between said first and second pieces providing said locking parts for assembly of the sinking weight in firm assembly with the snag-hook,
 said one of said pieces having the axial opening extending therethrough having a tapered shank for providing a predetermined spacing between the tips of the tines of the hook and the tapered shank to conform with state snag-fishing regulations.

2. For use with the snag-hook as described in claim 1, wherein the circumferentially spaced slots stop short of the tapered shank and the barbed ends of the hook, to increase the spacing between the tips of the barbed ends of the tines of the hook and the stem of the hook, where required by state regulations.

3. For use with the snag-hook as described in claim 2, wherein said one of said pieces having the tapered shank and axial opening extending therethrough may be interchangeably mounted on weighted body members to provide a preselected spacing between the tapered shank and the tips of the tines of the hook.

4. For use with the snag-hook as described in claim 1, wherein the interfitting parts formed between the first and second pieces comprise a threaded boss extending from the generally cylindrical weighted body member and the other of said pieces comprises an internally threaded bore for threading on said boss and clamping the tines of the hook between said two pieces.

5. For use with the snag-hook as described in claim 4, wherein the threaded boss has a beveled end engaging the bight portions of the tines of the hook and cooperating with the internally threaded piece having a tapered shank for centering the hook relative to the tapered shank.

* * * * *